United States Patent [19]

Davis

[11] 4,130,295
[45] Dec. 19, 1978

[54] HITCH ASSEMBLY FOR A FARM TRACTOR

[76] Inventor: Donald A. Davis, Rt. 2, Box 328, Covington, Ind. 47932

[21] Appl. No.: 794,529

[22] Filed: May 6, 1977

[51] Int. Cl.² .............................................. B60D 1/00
[52] U.S. Cl. .................................... 280/412; 172/277; 172/311
[58] Field of Search ........... 280/411 R, 411 A, 411 B, 280/411 C, 412, 413, 472, 473, 5 H, 5 R, 5 A; 239/172; 172/310, 311, 312, 313, 276, 277, 126, 130, 131, 649, 656, 657, 673, 679

[56] References Cited

U.S. PATENT DOCUMENTS

| | | | |
|---|---|---|---|
| 2,528,144 | 10/1950 | Horn | 172/277 |
| 3,100,654 | 8/1963 | Hunter | 280/412 |
| 3,900,201 | 8/1975 | Johnson | 280/481 X |

FOREIGN PATENT DOCUMENTS

| | | | |
|---|---|---|---|
| 179525 | 3/1966 | U.S.S.R. | 172/130 |
| 266412 | 7/1970 | U.S.S.R. | 280/413 |

*Primary Examiner*—John A. Pekar
*Attorney, Agent, or Firm*—John R. Nesbitt

[57] ABSTRACT

A hitch assembly is disclosed that is particularly useful for a farm tractor to pull ancillary farm equipment, such as ammonia applicators, across a field to be treated during a farming operation. The hitch assembly is connected to the front of the tractor and has struts that extend outwardly in opposite directions therefrom with the ancillary equipment being connected to the outer ends of the struts so that the ancillary equipment is maintained outwardly from the tractor as the tractor pulls such equipment by movement in a forward direction. The struts have inner and outer portions with the outer portion being hinged to the inner portion whereby the outer portion can be pivoted forwardly about a vertical axis so that the outer portion of the strut can be folded to a position where the outer end of the strut is contiguous to the mount utilized to mount the hitch assembly to the front of the tractor. Ground engaging wheels are mounted on the outer ends of the struts and extendible arms are received in the end portions of the struts to vary the effective length of the struts as needed. Connecting ears are attached to the extendible arms with the ancillary equipment being connected to the ears during operation.

7 Claims, 3 Drawing Figures

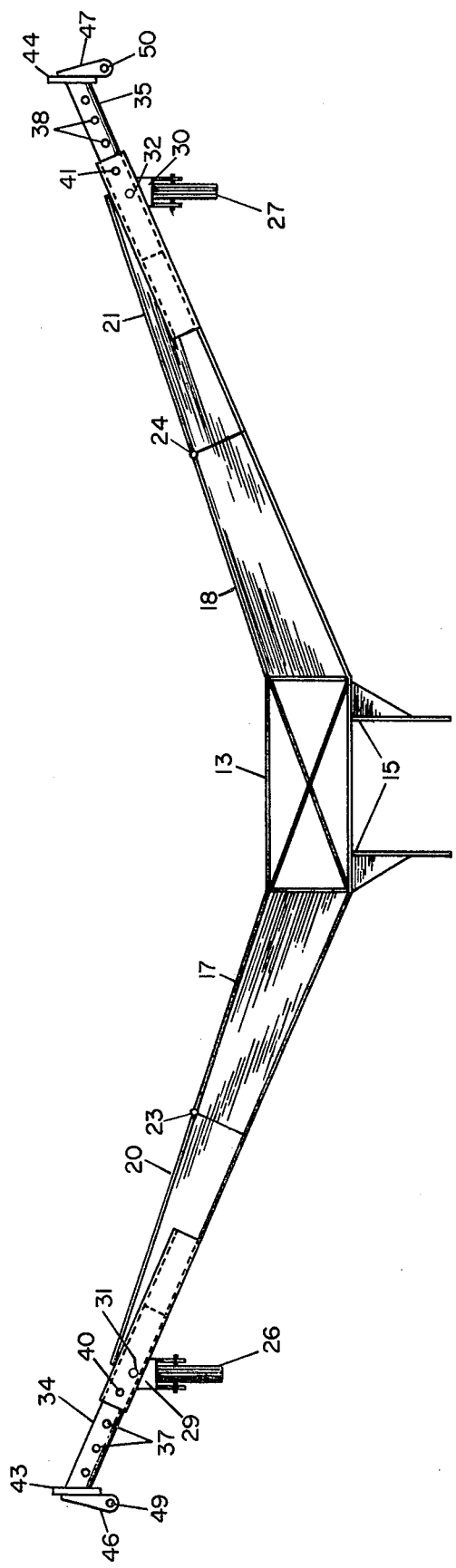
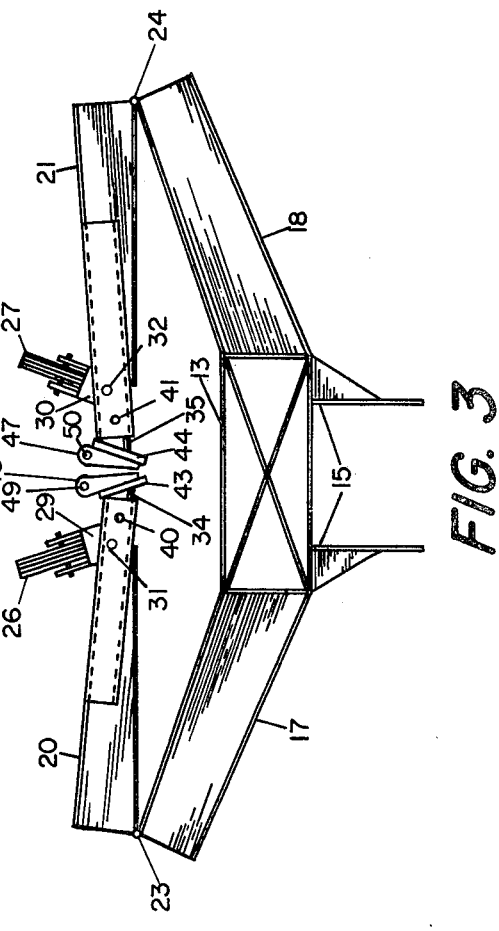
FIG. 2
FIG. 3

HITCH ASSEMBLY FOR A FARM TRACTOR

FIELD OF THE INVENTION

This invention relates to a hitch assembly and, more particularly, relates to a hitch assembly for a farm tractor.

BACKGROUND OF THE INVENTION

It is oftentimes necessary to provide a hitch assembly whereby a vehicle can pull other equipment. Such is the case, for example, where a farm tractor is used to pull ancillary farm equipment such as ammonia applicators.

While it is common for a tractor to pull equipment attached at the rear of the tractor, a need sometimes arises to pull other ancillary equipment during a farming operation. If this cannot be done, then either the operation cannot be carried out as desired, or several passes must be made across the field to accomplish the desired end.

If ancillary equipment could be pulled outwardly from the tractor, however, then a desired field treatment could be effected with a minimum of passes since the tractor would be free to pull additional equipment attached behind the tractor. In addition, in some cases, it might also be desirable that ancillary equipment be maintained outwardly from the tractor rather than rearwardly thereof.

SUMMARY OF THE INVENTION

This invention provides a hitch assembly for a movable vehicle such as a tractor that maintains the ancillary equipment outwardly from the tractor as the tractor is moved in a forward direction. The hitch assembly includes a pair of outwardly extending strut members that are hinged and ancillary equipment is connected with the outer ends of each of the struts which preferably includes length adjustable members and ground engageable wheels.

It is therefore an object of this invention to provide an improved hitch assembly.

It is another object of this invention to provide an improved hitch assembly for a movable vehicle to maintain ancillary equipment outwardly thereof.

It is still another object of this invention to provide an improved hitch assembly for a farm tractor to maintain farming equipment outwardly of said tractor during forward movement of the tractor.

It is yet another object of this invention to provide an improved hitch assembly having outwardly directed struts with ground engaging wheels on the end portions thereof.

It is still another object of this invention to provide an improved hitch assembly having struts that extend outwardly and forwardly with said struts having connecting means on the ends thereof for connection of ancillary equipment thereto.

It is still another object of this invention to provide an improved hitch assembly having a pair of outwardly extending struts that can be folded from an operative position.

It is yet another object of this invention to provide an improved hitch assembly having length adjustment members for adjusting the distance ancillary equipment is maintained from a pulling tractor.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein-disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 2 is a top view of the hitch assembly of this invention shown in operative position; and FIG. 3 is a top view of the hitch assembly of this invention shown in a folded position.

DESCRIPTION OF THE INVENTION

Figure 1:
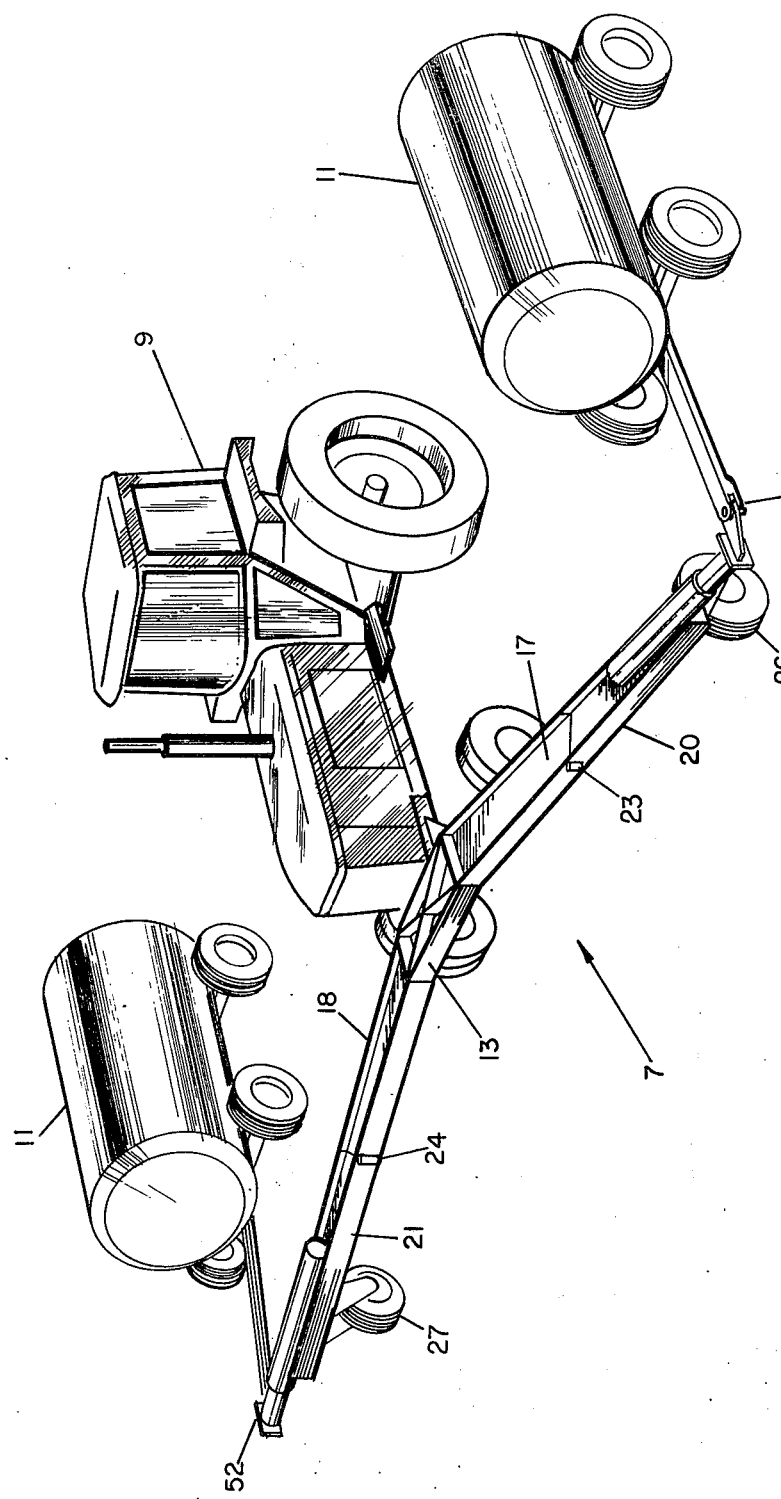
FIG. 1 is a perspective view illustrating a tractor having the hitch assembly of this invention mounted thereon and pulling a pair of ammonia applicators.

Referring now to the drawings, the hitch assembly of this invention is shown in FIG. 1 to include a mount 7 for mounting the assembly to the front of a movable vehicle such as a conventional tractor 9. As shown, the hitch assembly maintains ancillary farm equipment 11, such as conventional ammonia applicators, as indicated in FIG. 1, outwardly of the tractor 9. The hitch assembly is chosen so that the ancillary equipment 11 is maintained outwardly from the tractor as the tractor is moved in a forward direction including movements such as turns made by the tractor.

The hitch assembly is necessarily of sturdy material, preferably steel, as is common for farm implements. Mount 7 includes a central portion 13, which may be of heavy material in any desired configuration to add weight, as necessary, at the front of the tractor, with the back or rear edge of the central portion having attachment bars 15 for attachment of the mount to the front of a conventional tractor. The attachment means may be varied as needed for any particular tractor or other movable vehicle, and the central portion of the mount may have reinforcing rods as might be necessary or desirable.

A pair of inner struts 17 and 18 extend from opposite sides of mount 7 and may be connected thereto in any conventional fashion (if desired, the inner struts could be integrally formed with the mount). Inner struts 17 and 18 may be of girder-like construction, or any other configuration so long as sufficient rigidity is established to enable the desired function to be accomplished, i.e., pulling of connected ancillary equipment.

Inner struts 17 and 18 extend outwardly from mount 7 and also extend forwardly with respect thereto as shown best in FIGS. 2 and 3. Preferably, struts 17 and 18 extend forwardly at an angle of about $24\frac{1}{2}°$ with respect to a line parallel to the longitudinal axis of the mount (i.e., normal to the longitudinal axis of the tractor to be connected to the mount).

A pair of outer struts 20 and 21 are hinged to inner struts 17 and 18, respectively, by dual hinges 23 and 24, respectively. The hinging action provided is about a vertical axis so that the outer struts can be folded from the operative position, as shown in FIG. 2, in an arc forwardly with the outer end of the outer struts being contiguous to the mount 7 when folded as shown in FIG. 3. Folding of the struts is desirable, for example, when the hitch assembly is not in use or when a restrictive clearance is encountered through which the tractor must pass. While the length of the outer struts depends upon the use contemplated, it has been found that such struts may be of a length of about 5½ feet and be effectively utilized.

Ground engaging wheels 26 and 27 are connected to the outer ends of outer struts 20 and 21, respectively, by wheel mounts 29 and 30, respectively, with wheels 26 and 27 being preferably mounted by swivel connectors 31 and 32, respectively, so as to be freely pivotable about a vertical axis. By so mounting, the wheels are free to swivel as necessary to follow movement of the tractor as it turns, particularly during forward movement with ancillary equipment being pulled through the hitch assembly.

A pair of extendible arms 34 and 35 are received at the ends of outer struts 20 and 21, respectively, so that the arms may be telescoped into the ends of the struts as needed. This enables the effective length of the struts to be adjusted as necessary by moving the arms into and out of the outer struts. A plurality of apertures 37 and 38 are formed in arms 34 and 35, respectively, with the apertures being alignable with apertures 40 and 41 in outer struts 20 and 21, respectively, to allow the arms to be releasably fastened in conventional fashion, such as by bolts therethrough, for example.

At the end of each arm 34 and 35, end mounts 43 and 44 are utilized to fasten rearwardly facing ears 46 and 47, respectively, to the arms. Ears 46 and 47 have apertures 49 and 50, respectively, therein to facilitate connection by the connecting arms 52 and 53 of ancillary equipment to be pulled, such as ammonia applicators.

In operation, the extendible arms 34 and 35 are adjusted to achieve the desired overall length of each strut. This length is chosen as desired for the particular farming operation. By way of example, the overall length of each strut can be about 13 feet from the center of the mount to the ear aperture so that the ancillary equipment would be separated from center-line to center-line, about 26 feet. With the struts 13 feet in length, the ear aperture is about 4½ feet ahead of the rear edge of the mount. This has been shown in a working embodiment to be sufficient to maintain ammonia applicators outwardly of a conventional tractor even during turns made by the tractor.

After adjustment of the struts, the ancillary equipment is then connected to the ears at the ends of the struts and the equipment is then ready for use. After use and after the ancillary equipment has been removed, the struts may be folded from the operative position (as shown in FIG. 2) to a folded position (as shown in FIG. 3) until again needed.

If desired, and as has now been found to be preferable at least for some applications, outer struts 20 and 21 can be hinged to pivot about a horizontal axis so that when folded, the outer struts are pivoted in an arc upwardly and then downwardly so that the outer ends are brought to a position contiguous to the mount 13. For this operation, it has been found preferable to utilize a pair of hydraulic cylinders attached to the inner struts with the extendable pistons extending from the cylinder to the outer struts. Thus, with the pistons extended, the outer struts are pivoted to the operative position (as shown in FIGS. 1 and 2) and when the pistons are withdrawn, the outer struts are pivoted to fold by pivoting along the horizontal axis.

As can be seen from the foregoing, the hitch assembly of this invention provides an improved assembly that is particularly well suited for farming operations.

What is claimed is:

1. A hitch assembly for a movable vehicle, said hitch assembly comprising:

mounting means for mounting said hitch assembly to the front portion of a movable vehicle;

a pair of elongated strut members having end portions and a central portion, each of said strut members extending outwardly and forwardly from said mounting means and is connected at one end portion with said mounting means, said strut members extending outwardly in substantially opposite directions from said mounting means, and each of said strut members including hinge means connected at said central portion of each of said strut members whereby each of said strut members may be folded so that said other end portion is contiguous to said mounting means; and connecting means mounted on said other end portion of each of said strut members whereby ancillary equipment may be connected with each of said strut members so that said equipment when so connected is maintained outwardly of said vehicle during forward movement of said vehicle.

2. A hitch assembly for a movable vehicle, said hitch assembly comprising:

mounting means for mounting said hitch assembly to the front portion of a movable vehicle;

a pair of elongated strut members each of which extends outwardly and forwardly from said mounting means and is connected at one end portion with said mounting means, said strut members extending outwardly in substantially opposite directions from said mounting means, and each of said strut members including an extendible arm at the other end portion whereby the length of each said strut member may be adjusted; and connecting means mounted on said extendible arm at said other end portion of each of said strut members whereby ancillary equipment may be connected with each of said strut members so that said equipment when so connected is maintained outwardly of said vehicle during forward movement of said vehicle.

3. A hitch assembly for a farming vehicle, said hitch assembly comprising:

mounting means for mounting the hitch assembly to a farming vehicle;

a pair of elongated strut members having end portions and a central portion with each of said strut members being connected at one end portion with said mounting means, said strut members extending outwardly in substantially opposite directions from said mounting means, and each of said strut members including hinge means connected at said central portion whereby said other end portion of each said strut member may be pivoted to fold against said one end portion mounted to said mounting means;

ground engageable means mounted on the outer end portion of each of said strut members, said ground engageable means being wheels freely pivotable about an axis substantially normal with said ground with said wheels being contiguous to said mounting means when said other end portion of said strut member is pivoted to fold against said one end portion of said strut member; and connecting means mounted on said outer end portion of each of said strut members whereby ground engaging ancillary equipment may be connected with each of said strut members so that said equipment when so connected can be pulled by said farming vehicle as said vehicle is moved in a forward direction, said strut members maintaining said equipment outwardly of said vehicle.

4. A hitch assembly for a farming vehicle, said hitch assembly comprising:

mounting means for mounting the hitch assembly to a farming vehicle;

a pair of elongated strut members each of which is connected at one end portion with said mounting means, said strut members extending outwardly in substantially opposite directions from said mounting means, and each of the other end portions of said strut members having an arm thereon receivable in said end portion and extendible from the end thereof whereby the effective length of said strut members may be adjusted;

ground engageable means mounted on the outer end portion of each of said strut members, said ground engageable means being wheels mounted on said strut members with said wheels being freely pivotable about an axis substantially normal with said ground; and connecting means mounted on said extendible arms at said other end portion of each of said strut members whereby ground engaging ancillary equipment may be connected with each of said strut members so that said equipment when so connected can be pulled by said farming vehicle as said vehicle is moved in a forward direction, said strut members maintaining said equipment outwardly of said vehicle.

5. A hitch assembly for a farm tractor, said hitch assembly comprising:

a mount for mounting said hitch assembly to the front of a farm tractor;

a pair of inner strut members each of which has an inner end connected to said mount with said inner strut members extending outwardly and forwardly from opposite sides of said mount and terminating at outer ends;

a pair of outer strut members having inner and outer ends;

hinge means connecting the outer end of each of said inner strut members with the inner end of a different one of each of said outer strut members to establish a substantially vertical hinge axis therebetween whereby said outer strut members may be pivoted forwardly about a substantially vertical axis so that the outer end of each of said outer strut members may be pivoted to a position contiguous to and forwardly of said mount;

a pair of ground engageable wheels each of which is mounted at the outer end of a different one of each of said outer strut members, each of said wheels being mounted to be freely pivotable about a substantially vertical axis;

a pair of extendible arms having inner and outer ends with the inner ends of each of said arms being received in the outer end of a different one of each of said outer strut members, said arms being lengthwise movable with respect to said outer strut members whereby each of said arms may be moved into and out of said strut members to vary the distance of the outer ends of said arms from the outer ends of said strut members;

releasable positioning means for maintaining said extendible arms in a predetermined position with respect to said outer strut members; and connecting ears attached to the outer ends of said arms whereby ancillary farming equipment may be connected thereto so that when so connected said equipment is maintained outwardly of said tractor as said equipment is pulled in a forward direction by said tractor.

6. The hitch assembly of claim 5 wherein said strut members extend forwardly at about an angle of 24½° with respect to a line normal to the longitudinal axis of said farm tractor.

7. The hitch assembly of claim 5 wherein said inner and outer strut members extend outwardly a total distance of about 13 feet in each direction from the center of said mount and forwardly with respect to the rear edge of said mount a distance of about 4½ feet.

* * * * *